(12) United States Patent
Kim

(10) Patent No.: US 9,368,996 B2
(45) Date of Patent: Jun. 14, 2016

(54) WIRELESS POWER AND DATA TRANSMISSION AND RECEPTION SYSTEM

(75) Inventor: Sang Joon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1164 days.

(21) Appl. No.: 13/229,508

(22) Filed: Sep. 9, 2011

(65) Prior Publication Data

US 2012/0161531 A1 Jun. 28, 2012

(30) Foreign Application Priority Data

Dec. 23, 2010 (KR) .................. 10-2010-0133449

(51) Int. Cl.
*H02J 17/00* (2006.01)
*H02J 7/02* (2016.01)
*H02J 7/00* (2006.01)
*H04B 5/00* (2006.01)

(52) U.S. Cl.
CPC ............... *H02J 7/025* (2013.01); *H02J 7/0004* (2013.01); *H04B 5/0031* (2013.01); *H04B 5/0037* (2013.01); *H04B 5/0075* (2013.01)

(58) Field of Classification Search
CPC ...... H02J 7/0004; H02J 7/025; H04B 5/0031; H04B 5/0037; H04B 5/0075
USPC .................. 307/104, 1–3, 112–113; 365/149; 455/41.1
See application file for complete search history.

(56) References Cited

U.S. PATENT DOCUMENTS

| | | | |
|---|---|---|---|
| 4,531,113 A * | 7/1985 | Abraham | 341/136 |
| 2003/0171109 A1* | 9/2003 | Ballweber et al. | 455/323 |
| 2004/0130916 A1* | 7/2004 | Baarman | 363/21.02 |
| 2006/0158910 A1* | 7/2006 | Hunt et al. | 363/35 |
| 2009/0010360 A1* | 1/2009 | Murdoch | 375/302 |
| 2009/0243397 A1* | 10/2009 | Cook et al. | 307/104 |
| 2010/0085159 A1 | 4/2010 | Desjeux et al. | |
| 2010/0181961 A1* | 7/2010 | Novak et al. | 320/108 |

(Continued)

FOREIGN PATENT DOCUMENTS

| | | |
|---|---|---|
| EP | 1 798 867 A2 | 6/2007 |
| JP | 9-121182 A | 5/1997 |

(Continued)

OTHER PUBLICATIONS

Extended European Search Report issued Dec. 9, 2013 in counterpart European Patent Application No. 11193274.5. (7 pages in English).

(Continued)

*Primary Examiner* — Jared Fureman
*Assistant Examiner* — Joel Barnett
(74) *Attorney, Agent, or Firm* — NSIP Law

(57) ABSTRACT

Provided are an apparatus and a method for simultaneously transmitting and receiving a wireless power and data. A wireless power and data transmission apparatus may include: a modulator configured to modulate first data by adjusting a power amount to be charged in one or more capacitors; a switch controller configured to control one or more switches corresponding the one or more capacitors based on a charging time to charge the one or more capacitors and a transfer time to transfer a power charged in the one or more capacitors and the modulated first data to a source resonator; and a transmitter configured to transmit the charged power and the modulated first data using the source resonator.

39 Claims, 12 Drawing Sheets

(56) References Cited

U.S. PATENT DOCUMENTS

| | | | | |
|---|---|---|---|---|
| 2011/0081857 | A1* | 4/2011 | Lee et al. | 455/41.1 |
| 2011/0264945 | A1* | 10/2011 | Tsai et al. | 713/340 |
| 2011/0299636 | A1* | 12/2011 | Tsai et al. | 375/340 |
| 2012/0196529 | A1* | 8/2012 | Huomo et al. | 455/41.1 |

FOREIGN PATENT DOCUMENTS

| | | |
|---|---|---|
| JP | 06-311057 | 4/2004 |
| JP | 2009-508414 A | 2/2009 |
| JP | 2009-060736 | 3/2009 |
| KR | 2001-0004630 | 1/2001 |
| WO | WO 2007/030864 A1 | 3/2007 |

OTHER PUBLICATIONS

Japanese Office Action issued Jan. 27, 2015 in counterpart Japanese Application No. JP 2011-277218 (5 pages, in Japanese, with English translation).

* cited by examiner

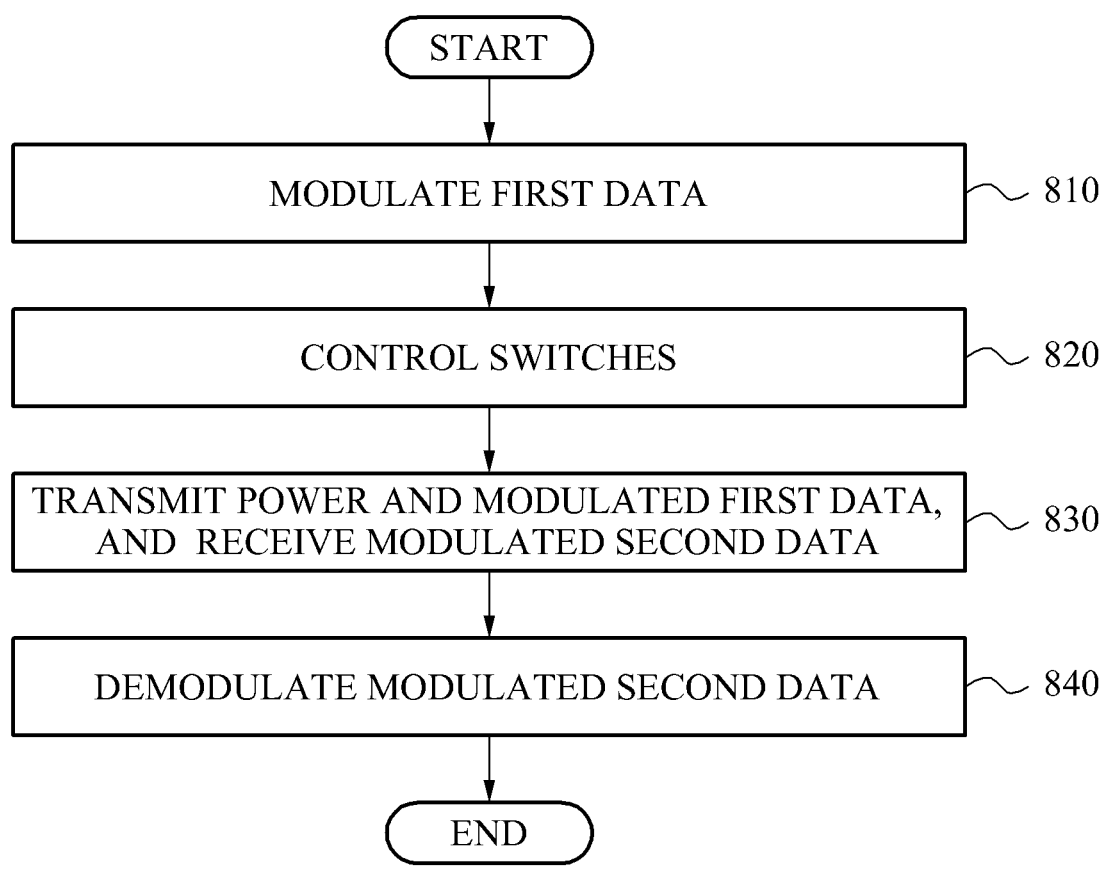

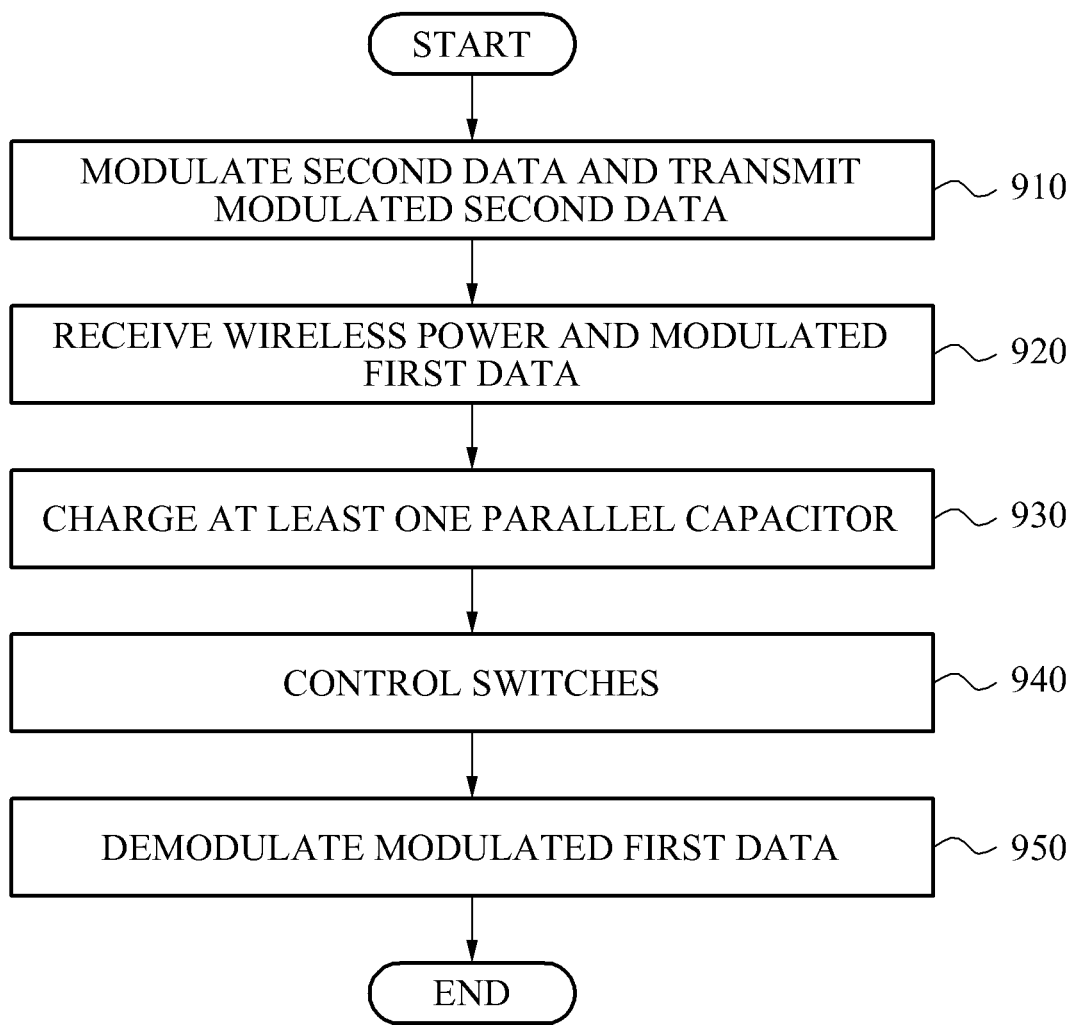

WIRELESS POWER AND DATA TRANSMISSION AND RECEPTION SYSTEM

CROSS-REFERENCE TO RELATED APPLICATION

This application claims the benefit under 35 U.S.C. §119 (a) of Korean Patent Application No. 10-2010-0133449, filed on Dec. 23, 2010, in the Korean Intellectual Property Office, the entire disclosure of which is incorporated herein by reference for all purposes.

BACKGROUND

1. Field

The following description relates to a wireless power and data transmission and reception system configured to transmit and/or receive a wireless power and data.

2. Description of Related Art

Research on wireless power transmission has been undertaken seeking to overcome inconveniences of wire power supply, a limit of conventional battery capacity, increased probability of explosion of portable devices, and the like. In particular, research on short distance wireless power transmission has been carried out.

In short distance wireless power transmission, a distance between a transmission coil and a reception coil is sufficiently short in comparison with a length of a wavelength at an operating frequency. An operation principle of the short distance wireless power transmission corresponds to a scheme of generating a magnetic field using the transmission coil at a given operating frequency, and of transferring stored energy to the generated magnetic field by generating an induced current in the reception coil. Wireless power transmission technologies may use a resonance characteristic of radio frequency elements. One conventional wireless power transmission system which uses a resonance characteristic includes a source to supply a power, and a target to receive the power.

SUMMARY

According to an aspect, a wireless power and data transmission apparatus may include: a modulator configured to modulate first data by adjusting a power amount to be charged in one or more capacitors; a switch controller configured to control one or more switches corresponding the one or more capacitors based on a charging time to charge the one or more capacitors and a transfer time to transfer a power charged in the one or more capacitors and the modulated first data to a source resonator; and a transmitter configured to transmit the charged power and the modulated first data using the source resonator.

The apparatus may further include: a power input unit configured to charge the one or more capacitors by receiving an input of a power from a power supply apparatus.

The power input unit may be configured to charge the one or more capacitors by receiving an input of a power from a DC power supply apparatus or an AC power supply apparatus.

The apparatus may further include: a receiver configured to receive modulated second data from a target resonator during the transfer time, using the source resonator.

The apparatus may further include: a demodulator configured to demodulate the modulated second data based on the power amount stored in the one or more capacitors at a point in time when the transfer time is switched to the charging time;

The modulator may be configured to modulate the first data by quantizing the power amount into N levels.

The switch controller may be configured to control the one or more switches so that overlap between the charging time and the transfer time is avoided for a single capacitor.

The switch controller may be configured to transfer the charged power and the modulated first data to the source resonator by controlling the one or more switches corresponding to each of the charged one or more capacitors at predetermined time intervals based on the transfer time.

The transfer time may comprise: a first marginal time used when the one or more switches are connected to the charged one or more capacitors; a transmission time used to transmit the wireless power charged in the one or more capacitors, and the modulated first data; and a second marginal time used to open the one or more switches connected to the one or more capacitors after the transmission time terminates.

The demodulator may be configured to demodulate the modulated second data by quantizing the power amount into M levels, based on predetermined mapping information.

The apparatus may further include: a sensing unit configured to sense a voltage of the one or more capacitors at the point in time when the transfer time is switched to the charging time, wherein the demodulator is configured to demodulate the modulated second data based on the sensed voltage.

The one or more capacitors may be arranged in a parallel manner.

According to an aspect, a wireless power and data reception apparatus may include:

a receiver configured to charge at least one parallel capacitor by receiving wireless power and modulated first data using a target resonator; a switch controller configured to control one or more switches corresponding to the one or more capacitors based on a charging time to charge the one or more capacitors and a transfer time to transfer a power charged in the one or more capacitors and demodulated first data to a target device; and a demodulator configured to demodulate the modulated first data based on a power amount stored in the at one or more capacitors at a point in time when the charging time is switched to the transfer time.

The apparatus may further include: a modulator configured to modulate second data by adjusting the power amount to be charged in the one or more capacitors.

The apparatus may further include: a transmitter configured to transmit the modulated second data to a source resonator during the charging time using the target resonator.

The apparatus may further include: a power output unit configured to transfer the power charged in the one or more capacitors and the demodulated first data to the target device.

The modulator may be configured to modulate the second data by quantizing the power amount into M levels.

The switch controller may be configured to control the one or more switches so that overlap between the charging time and the transfer time is avoided for a single capacitor.

The switch controller may be configured to control the charging time and the transfer time by sensing the power stored in the one or more capacitors.

The switch controller may be configured to transfer the modulated second data to the target resonator by controlling the one or more switches corresponding to each of the one or more capacitors at predetermined time intervals based on the charging time.

The charging time may comprise: a first marginal time used when the one or more switches are connected to the one or more capacitors; a reception time used to receive the wireless power charged in the one or more capacitors, and the modulated first data; and a second marginal time used to open the one or more switches connected to the one or more capacitors after the reception time terminates.

The demodulator may be configured to demodulate the first data modulated by quantizing the power amount into N levels, based on predetermined mapping information.

The apparatus may further include: a sensing unit configured to sense a voltage of the one or more capacitors at the point in time when the charging time is switched to the transfer time, wherein the demodulator is configured to demodulate the modulated first data based on the sensed voltage.

The one or more capacitors may be arranged in a parallel manner.

According to an aspect, a wireless power and data transmission method may include: modulating first data by adjusting a power amount to be charged in one or more capacitors; controlling one or more switches corresponding to each of the one or more capacitors based on a charging time to charge the one or more capacitors, and a transfer time to transfer the power charged in the one or more capacitors and the modulated first data to a source resonator; and transmitting the charged power and the modulated first data using the source resonator.

The method may further include: charging the one or more capacitors by receiving an input of a power from a power supply apparatus.

The method may further include: receiving the modulated second data from a target resonator during the transfer time, using the source resonator.

The method may further include: demodulating second data modulated based on the power amount stored in the one or more capacitors at a point in time when the transfer time is switched to the charging time.

The modulating may modulate the first data by quantizing the power amount into N levels.

The demodulating may demodulate the second data modulated may be by quantizing the power amount into M levels, based on predetermined mapping information.

According to an aspect, a wireless power and data reception method may include: charging at least one parallel capacitor by receiving wireless power and modulated first data using a target resonator; controlling one or more switches corresponding to each of the one or more capacitors based on a charging time to charge the one or more capacitors, and based on a transfer time to transfer a power charged in the one or more capacitors and demodulated first data to a target device; and demodulating the modulated first data based on a power amount stored in the one or more capacitors at a point in time when the charging time is switched to the transfer time.

The method may further include: modulating second data by adjusting the power amount to be charged in the one or more capacitors.

The method may further include: transmitting the modulated second data to a source resonator during the charging time using the target resonator.

The method may further include: transferring the power charged in the one or more capacitors and the demodulated first data to the target device.

The modulating may modulate the second data by quantizing the power amount into M levels.

The demodulating may demodulate the first data modulated by quantizing the power amount into N levels, based on predetermined mapping information.

Other features and aspects will be apparent from the following detailed description, the drawings, and the claims.

BRIEF DESCRIPTION OF THE DRAWINGS

FIG. 8 is a flow chart illustrating a wireless power and data transmission method.

FIG. 9 is a flow chart illustrating a wireless power and data reception method.

Figure 1:
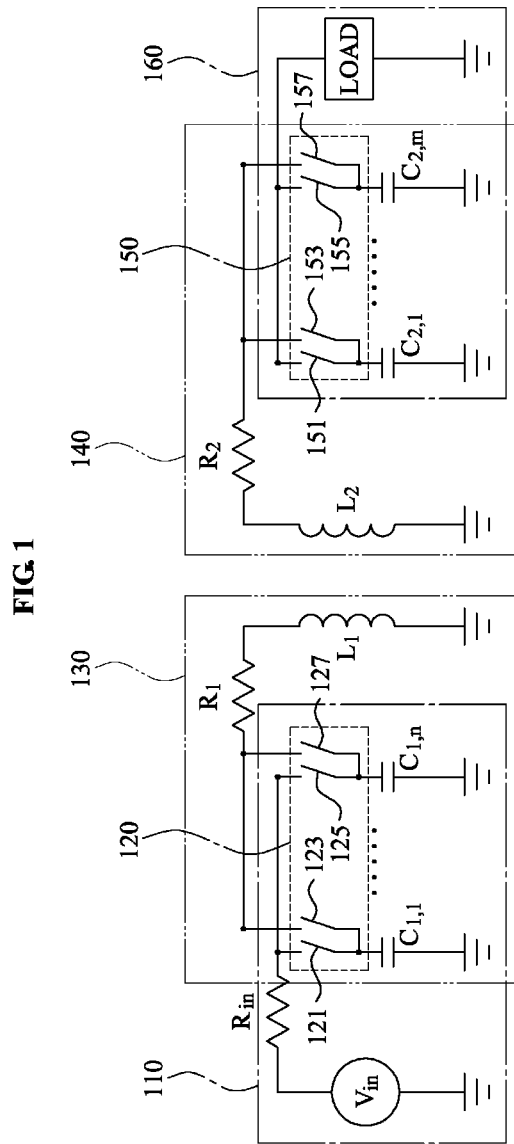
FIG. 1 is a diagram illustrating an equivalent circuit of a wireless power and data transmission and reception system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or system described herein. Accordingly, various changes, modifications, and equivalents to the methods, apparatuses, and/or system described herein will be suggested to those of ordinary skill in the art. The progression of processing steps and/or operations described is an example; however, the sequence of and/or operations are not limited to that set forth herein and may be changed as is known in the art, with the exception of steps and/or operations necessarily occurring in a certain order. Also, description of well-known functions and constructions may be omitted for increased clarity and conciseness.

A wireless power transmission system may correspond to a source-target configuration including a source and a target. In various embodiments, the wireless power transmission system may include a wireless power transmission apparatus corresponding to the source, and a wireless power reception apparatus corresponding to the target.

There may be two methods for transmitting and receiving information in the wireless transmission system.

The first method may be considered a form of load modulation. The first method may transmit and receive information by adjusting impedance of a wireless power transmission apparatus and a wireless power reception apparatus, and by sensing an amount of voltage change based on the adjusted impedance. For example, when information is desired to be transmitted from the wireless power reception apparatus to the wireless power transmission apparatus, the wireless reception apparatus may adjust load impedance, and the wireless power transmission apparatus may sense a voltage applied to a transmission coil. Then an amount of the voltage applied to the transmission coil may be changed based on a change in the load impedance, and thus the wireless power transmission apparatus may receive information by sensing the amount of voltage change.

The second method may include a traditional wireless information transmission scheme used in wireless communication. The wireless power transmission system may be construed to transmit power using a type of wireless communication channel. Accordingly, the wireless power transmission system may transfer information using a wireless communication channel, separate from wireless power transmission. The wireless power transmission system may use various conventional modulation techniques such as a frequency shift keying modulation, an amplitude shift keying modulation, a phase shift keying modulation, and/or the like. However, since a frequency to transmit a wireless power and a frequency to transmit information are equivalent, a wireless power transmission section and an information transmission section may be temporally classified. Also, separate power may be required for data transmission in the wireless power transmission apparatus and the wireless power reception apparatus.

These two methods may be applied to a circuit where a power input unit of the wireless power transmission apparatus and a transmission coil are physically connected, and a power output unit of the wireless power reception apparatus and a reception coil are physically connected.

There are several considerations to enhance wireless power transmission efficiency with respect to the circuit where the power input unit of the wireless power transmission apparatus and the transmission coil are physically connected, and the power output unit of the wireless power reception apparatus and the reception coil are physically connected.

For example, where the power input unit of the wireless power transmission apparatus and the transmission coil are physically connected, and the power output unit of the wireless power reception apparatus and the reception coil are physically connected, the circuit may require frequency matching, impedance matching, a high efficiency power amplifier, and a rectifier based on a change in an operating environment such as changes in a distance between resonators, and a target, in order to enhance transmission efficiency.

Thus, the wireless power and data transmission and reception system may include a circuit having the power input unit of the wireless power transmission apparatus and the transmission coil are physically separated, and the power output unit of the wireless power reception apparatus and the reception coil are physically separated. Such a circuit may not require impedance matching, or the like.

One method of transmitting and receiving information may be used in the circuit where the power input unit of the wireless power transmission apparatus and the transmission coil are physically separated, and the power output unit of the wireless power reception apparatus and the reception coil are physically separated. When a method of adjusting load impedance is used, power transmission efficiency may be rapidly reduced. And since the transmission coil and the reception coil are matched at a high Q factor value, the power transfer efficiency may be rapidly reduced by slight impedance mismatching based on a change in the load impedance. In a traditional wireless information transfer method, the power input unit of the wireless power transmission apparatus and the transmission coil may be physically connected, and the power output unit of the wireless power reception apparatus and the reception coil may be physically connected.

According to one or more embodiments, a wireless power and data transmission and reception system may provide a method of transmitting and/or receiving information in which the power input unit of the wireless power transmission apparatus and the transmission coil are physically separated (or isolated), and the power output unit of the wireless power reception apparatus and the reception coil are physically separated (or isolated).

The wireless power and data transmission and reception system may be applied to various systems that require wireless power transmission, and simultaneous transmission of a wireless power and wireless data. Some representative examples of wireless power transmission may include wireless charging of a cellular phone, a wireless television (TV), and/or the like. Also, the wireless power and data transmission and reception system may be applied to a bio or health care fields. In particular wireless power transmission may be used to, transmit power to a device inserted in a human body or positioned proximate to the human body. For example, a heart-rate measuring device may be configured as a type of a bandage without a wired connection. In addition, the wireless power and data transmission and reception system may be used to exchange data and/or control information between the wireless power transmission apparatus and the wireless power reception apparatus.

The wireless power and data transmission and reception system may be applied to information input and output of an information storage apparatus without a power source. The wireless power transmission system may be applied to a system that may wirelessly supply the information storage apparatus with a power to remotely operate the apparatus, and simultaneously recall information stored in the storage apparatus.

FIG. 1 includes an equivalent circuit of a wireless power and data transmission and reception system.

The equivalent circuit of the wireless power and data transmission and reception system may be represented as a circuit where power input and output units, and transmission and reception ends are separated, for example, a resonator isolation system (RIS).

As shown in FIG. 1, the circuit where the power input and output units, and the transmission and reception ends are physically separated (or isolated) from each other. The circuit may include a power input unit 110, a first switch controller 120, a transmitter 130, a receiver 140, a second switch controller 150, and a power output unit 160.

The power input unit 110 may be configured to charge one or more capacitors (with a plurality of capacitors being shown in FIG. 1) by receiving an input of a power from a power source $V_{in}$. The power input unit 110 may include the power source $V_{in}$, an internal resistance $R_{in}$, and a plurality of one or more capacitors (for example, capacitor $C_{1,1}$ through capacitor $C_{1,n}$). If multiple capacitors are included, they may be arranged in a parallel manner. Although, it will be appreciated that the capacitors can also be arranged in a serial manner, or even in a combination parallel and serial arrangement. Each of the one or more capacitors, i.e., the capacitor $C_{1,1}$ through the capacitor $C_{1,n}$ may be connected to the power input unit 110 by a switch control of the first switch controller 120.

The first switch controller 120 may control one or more switches (or switching elements) corresponding to one or more capacitors, respectively and be configured to individually control the switch for each capacitor. The switches or switch elements may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to select between ON and OFF positions, which permit and prevent the flow of electricity (power), respectively. Accordingly the switches control electrical connection to and/or from one or more capacitors, thus enabling charging and discharging thereof. For instance, the switching controller may be configured, for example, to selectively (i) charge the one or more capacitors, and (ii) discharge power from the charged one or more capacitors.

For example, when a switch 121 and a switch 125, corresponding to capacitors $C_{1,1}$ and $C_{1,n}$, are both ON in the first switch controller 120, the one or more capacitors, the capacitor $C_{1,1}$ through the capacitor $C_{1,n}$ may be electrically connected to the power input unit 110. The switch 121 and the switch 125 may be either simultaneously ON, or independently ON.

The transmitter 130 may include a source resonator modeled as a basic circuit element $L_1$ and a basic circuit element $R_1$, and the one or more capacitors (for example, the capacitor $C_{1,1}$ through the capacitor $C_{1,n}$. The one or more capacitors that may be charged at the power input unit 110 may be connected to the transmitter 130 by the switch control of the first switch controller 120. When a switch 123 and a switch 127, corresponding to capacitors $C_{1,1}$ and $C_{1,n}$, are ON at the first switch controller 120, the capacitor $C_{1,1}$ through the capacitor $C_{1,n}$ may be electrically connected to the transmitter 130. For example, when the capacitor $C_{1,1}$ is connected to the power input unit 110, the capacitor $C_{1,1}$ may not be simultaneously connected to the transmitter 130. And the same may be true for the capacitor $C_{1,n}$. Since the power input unit 110 and the transmitter 130 are separated, the same capacitor may not be simultaneously connected to the power input unit 110 and the transmitter 130.

The receiver 140 may include a target resonator modeled as a basic circuit element $L_2$ and a basic circuit element $R_2$, and at least one capacitor (for example, a capacitor $C_{2,1}$ through a capacitor $C_{2,m}$). The receiver 140 may be configured to charge the one or more capacitors (i.e., the capacitor $C_{2,1}$ through the capacitor $C_{2,m}$) connected with the target resonator using a wireless power received by the target resonator. For example, the capacitor $C_{2,1}$ through the capacitor $C_{2,m}$ may be connected to the receiver 140 by a switch control of the second switch controller 150. When a switch 153 and a switch 157 are on at the second switch controller 150, the capacitor $C_{2,1}$ through the capacitor $C_{2,m}$ may be connected to the receiver 140. The switch 153 and the switch 157 may be either simultaneously ON, or independently ON.

The second switch controller 150 may control one or more switches (or switching elements) corresponding to one or more capacitors, respectively and be configured to individually control the switch for each capacitor. The switches or switch elements may include various electromechanical switches (e.g., contact, toggle, knife, tilt, or the like) or electrical switches (e.g., solenoid, relays, or solid-state elements such as a transistor switch, silicon-controlled rectifier or a triac). Of course, other types of switches are also possible. In various embodiments, the switch may be configured to select between ON and OFF positions, which permit and prevent the flow of electricity (power), respectively. Accordingly the switches control electrical connection to and/or from one or more capacitors, thus enabling charging and discharging thereof. For instance, the switching controller may be configured, for example, to selectively (i) charge the one or more capacitors, and (ii) discharge power from the charged one or more capacitors.

The power output unit 160 may include a target device, for example, a LOAD, and the one or more capacitors, i.e., the capacitor $C_{2,1}$ through the capacitor $C_{2,m}$. The one or more capacitors charged at the receiver 140 may be connected to the power output unit 160 by the switch control of the second switch controller 150. When a switch 151 and a switch 155 are ON at the second switch controller 150, the capacitor $C_{2,1}$ through the capacitor $C_{2,m}$ may be connected to the power output unit 160. For example, when the capacitor $C_{2,1}$ is connected to the receiver 140, the capacitor $C_{2,1}$ may not be simultaneously connected to the power output unit 160. The same may be true for the capacitor $C_{2,m}$. Since the receiver 140 and the power output unit 160 are separated, the same capacitor may not be simultaneously connected to the receiver 140 and the power output unit 160.

That is, the power input unit 110 and the transmitter 130 may be separated by the first switch control 120 in the wireless power transmission apparatus, and the receiver 140 and the power output unit 160 may be separated by the second switch controller 150 in the wireless power reception apparatus. For example, the power stored in the capacitors may be wirelessly transmitted from the source resonator to the target resonator, for example, using magnetic coupling. The receiver 140 and the power output unit 160 may correspond to physically separated configurations, and a change in load impedance of the power output unit 160 may not substantially affect impedance matching. The wireless power transmission apparatus and the wireless power reception apparatus may independently operate, and accordingly may maintain transmission efficiency even when the load impedance is changed.

In addition, the wireless power and data transmission and reception system may transmit and receive information using a power amount stored in one or more capacitors. The transmission and reception of information using the power amount will be further described in FIG. 2 and FIG. 3.

Figure 2:
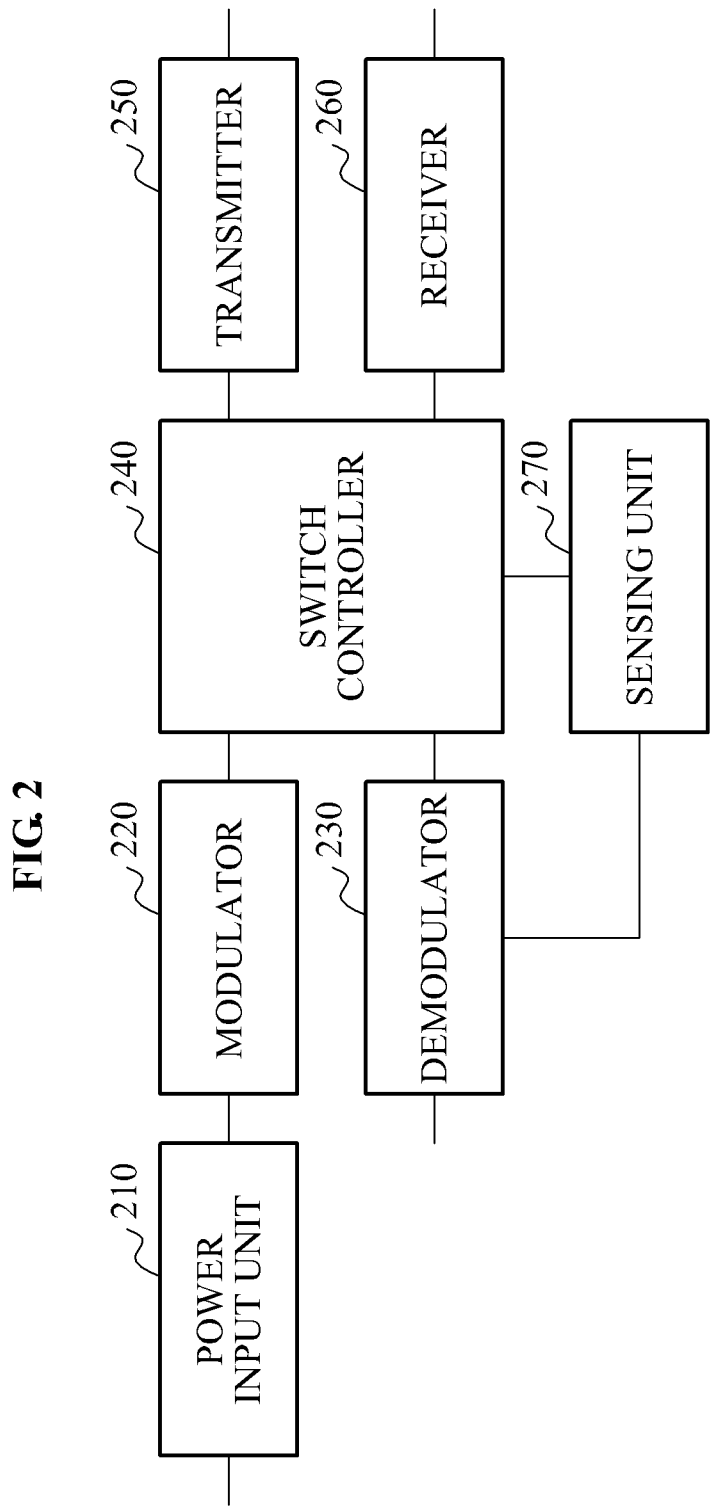
FIG. 2 is a block diagram illustrating a wireless power and data transmission apparatus.

FIG. 2 includes a wireless power and data transmission apparatus.

As shown, a wireless power and data transmission apparatus may include a power input unit 210, a modulator 220, a demodulator 230, a switch controller 240, a transmitter 250, a receiver 260, and a sensing unit 270.

The power input unit 210 may be configured to charge a one or more capacitors by receiving power from a power supply apparatus. For example, the power input unit 210 may charge the one or more capacitors by receiving an input of a power from a DC power supply apparatus or an AC power supply apparatus. The power input unit 210 may more easily charge the one or more capacitors using the DC power supply apparatus without substantial or additional configuring. Where the AC power supply apparatus is used, the power input unit 210 may charge the one or more capacitors by substituting a DC power, for an AC power, using an AC-DC converter, or by adding a switch and adjusting an appropriate timing of the switch.

The modulator 220 may be configured to modulate first data by adjusting a power amount to be charged in the one or more capacitors. The modulator 220 may modulate the first data based on the power amount stored in the capacitors. Mapped information may be different based on the power amount stored for the one or more capacitors, for instance.

In some embodiment, the modulator 220 may include a quantizer configured to quantize a power amount to be stored in the one or more capacitors into a plurality of levels, and/or a mapping unit configured to map predetermined information for each level to the power amount quantized into the plurality of the levels.

The modulator 220 may also be configured to modulate the first data by quantizing the power amount charged in the one or more capacitors into N levels, with N being an integer value. The first data may indicate information that the wireless power and data transmission apparatus desires to transfer to a wireless power and data reception apparatus. The first data may include information used for a control of the wireless power and data transmission and reception system.

The demodulator 230 may be configured to demodulate modulated second data based on the power amount stored in the one or more capacitors at a point in time when a transfer time is switched to a charging time. The transfer time may indicate a time used to transfer the power charged in the capacitors and the modulated first data to the transmitter 250. The transfer time may include a time used to receive the modulated second data from a target resonator using a source resonator. The charging time may indicate a time to charge the capacitors using the power input unit 210.

Wireless power transmitted from the target resonator during the transfer time may be received using the source resonator, and the received wireless power may be stored in the one or more capacitors. For a single capacitor, the demodulator 230 may demodulate the modulated second data based on the power amount stored in the single capacitor at the point in time that the transfer time is switched to the charging time. And for multiple capacitors, the demodulator 230 may demodulate the modulated second data based on the power amount stored in each of the capacitors.

The demodulator 230 may demodulate the modulated second data based on the amount of power stored in the single capacitor at a point in time when the transfer time is switched to the transfer time with respect to another capacitor after the transfer time with respect to the single capacitor terminates.

In some embodiments, the second data may be modulated by quantizing the power amount into M levels. The demodulator 230 may be configured to demodulate the modulated second data based on predetermined mapping information. Information corresponding to each of the quantized M levels may be stored in the predetermined mapping information. The second data may indicate information that the wireless power and data reception apparatus desires to transfer to the wireless power and data transmission apparatus, for instance. The second data may include information used for a control of the wireless power and data transmission and reception system. Other data and information may also be exchanged.

The switch controller 240 may be configured to control switches corresponding to each of the capacitors based on the charging time to charge the one or more capacitors, and based on the transfer time to transfer the power charged in the one or more capacitors and the modulated first data to the source resonator.

In addition, the switch controller 240 may be configured to control the switches so that overlap between the charging time and the transfer time is avoided, based on a single capacitor. For instance, the switch controller 240 may physically separate (or isolate) the power input unit 210 and the transmitter 250.

The switch controller 240 may also be configured to transfer the charged power and the modulated first data to the source resonator by controlling the switches corresponding to each of the one or more charged capacitors at predetermined time intervals based on the transfer time. After the power charged in a single capacitor and the modulated first data is transferred to the source resonator based on the transfer time, the switch controller 240 may control to connect the switches to one or more other capacitors.

The switch controller 240 may control the charging time and the transfer time by sensing the power stored in the capacitors. The switch controller 240 may be configured to sense the power stored in the capacitors connected to the power input unit 210, and may control the transfer time so that the capacitors are connected to the transmitter 250 when the power is charged greater than a predetermined value. The predetermined value may indicate a power amount quantized into N levels at the modulator 220.

The switch controller 240 may sense the power stored in the capacitors connected to the transmitter 250, and may control the charging time so that the plurality of the capacitors are connected to the power input unit 210 when the power is discharged lower than a predetermined value. The predetermined value may indicate the case that the power is completely discharged to be zero.

The transfer time may include a first marginal time used when the switches are connected to the charged capacitors. Also, the transfer time may include a transmission time used to transmit the wireless power charged in the capacitors and the modulated first data, and a second marginal time used to open the switches connected to the capacitors after the transmission time terminates.

The transmitter 250 may be configured to transmit the power charged in the one or more capacitors and the modulated first data. For example, power may be transmitted using a magnetic coupling. The transmitter 250 may transmit the power charged in the one or more capacitors and the modulated first data, for example, using the magnetic coupling, when the one or more charged capacitors are connected with the source resonator using the switch controller 240.

The receiver 260 may be configured to receive the modulated second data using the source resonator during the transfer time. The modulated second data may be transmitted from the target resonator of the wireless power and data reception apparatus.

The sensing unit 270 may be configured to sense a voltage of the one or more capacitors at a point in time when the transfer time is switched to the charging time. For example, the demodulator 230 may demodulate the modulated second data based on the sensed voltage.

Figure 3:
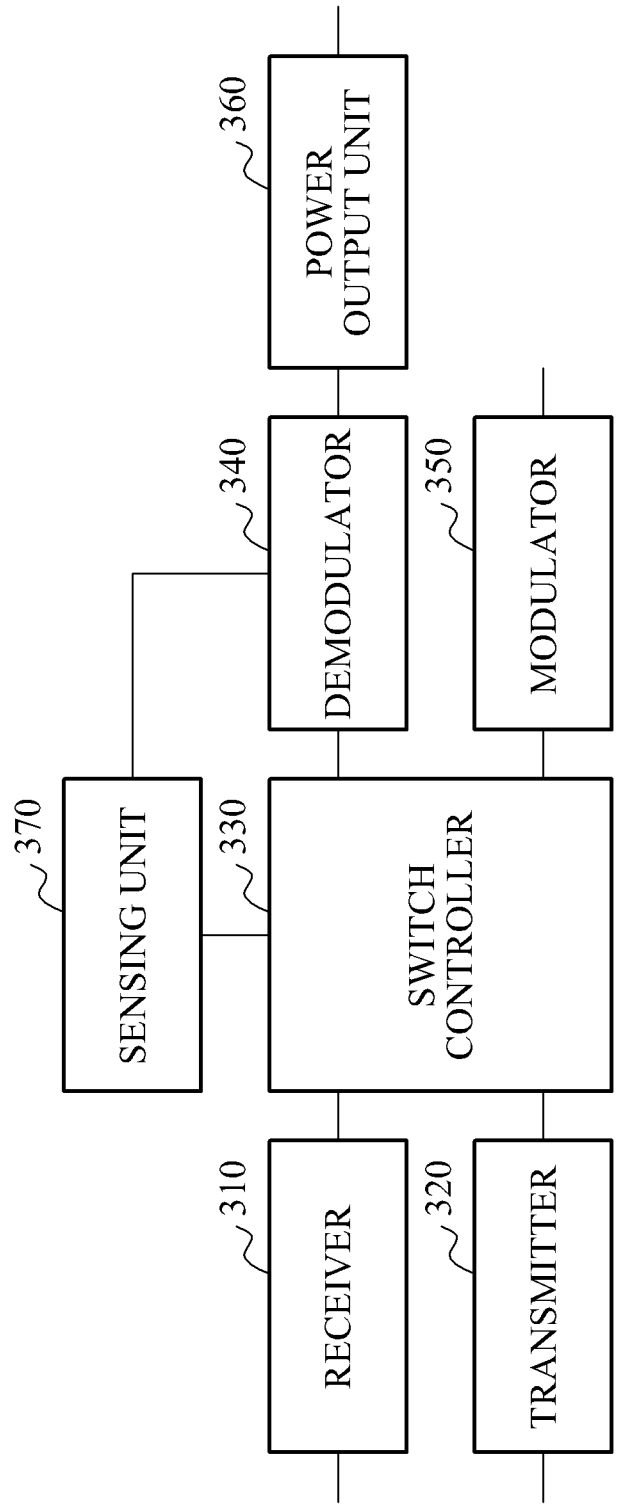
FIG. 3 is a block diagram illustrating a wireless power and data reception apparatus.

FIG. 3 illustrates a wireless power and data reception apparatus.

As shown, the wireless power and data reception apparatus may include a receiver 310, a transmitter 320, a switch controller 330, a demodulator 340, a modulator 350, a power output unit 360, and a sensing unit 370.

The receiver 310 may be configured to charge one or more capacitors by receiving a wireless power and modulated first data. The receiver 310 may receive the wireless power and the modulated first data using a target resonator. The first data may be modulated at a wireless power and data transmission apparatus. The first data may indicate information that the wireless power and data transmission apparatus desires to transfer to the wireless power and data reception apparatus, for example. The first data may include information for a control of the wireless power and data transmission and reception system. Other data and information may also be exchanged.

The transmitter 320 may be configured to transmit modulated second data to a source resonator during a charging time using the target resonator. The charging time may indicate a time used to charge the one or more capacitors using the receiver 310. The receiver 310 of the wireless power and data reception apparatus may receive the modulated first data while the one or more capacitors are charged, and the transmitter 320 may transmit the modulated second data. The transmitter 320 may transmit the modulated second data to the source resonator of the wireless power and data transmission apparatus using the target resonator.

The switch controller 330 may be configured to control switches corresponding to each of the one or more capacitors based on the charging time to charge the one or more capacitors, and based on a transfer time to transfer the power charged in the one or more capacitors and the demodulated first data to a target device. The transfer time may indicate a time used to transfer the power charged in the one or more capacitors and the demodulated first data to the target device using the power output unit 360.

The switch controller 330 may be configured to control the switches so that overlap between the charging time and the transfer time is avoided, based on, or for, a single capacitor. The switch controller 330 may physically separated from the receiver 310 and the power output unit 360.

The switch controller 330 may be configured to transfer the modulated second data to the target resonator by controlling the switches corresponding to each of the one or more capacitors at predetermined time intervals based on the charging time. After the modulated second data is transferred from the single capacitor to the target resonator based on the charging time, the switch controller 330 may control to connect the switches to another capacitor.

The switch controller 330 may be configured to control the charging time and the transfer time by sensing the power stored in the one or more capacitors.

The charging time may include a first marginal time used when the switches are connected to the one or more capacitors. For example, the first marginal time may be shorter than the first marginal time of the wireless power and data transmission apparatus. In order to operate the wireless power and data reception apparatus, an operating power may be needed. The operating power may be received before the modulated first data is received from the wireless power and data transmission apparatus. The wireless power and data reception apparatus may receive the modulated first data after the operating power is received. However, when a separate operating power is prepared in the wireless power and data reception apparatus, the first marginal time of the wireless power and data transmission apparatus, and the first marginal time of the wireless power and data reception apparatus may be equivalent.

The charging time may include a reception time used to receive the wireless power charged in the one or more capacitors and the modulated first data, and a second marginal time to open the switches connected to the one or more capacitors after the reception time terminates. The modulated data may be transmitted during the reception time, for instance.

The switch controller 330 may be configured to connect, to the receiver 310, a capacitor to be charged during the charging time to charge the one or more capacitors. The capacitor to be charged and the receiver 310 may be connected or disconnected by ON and OFF operations, respectively, of the switches. While the capacitor to be charged and the receiver 310 are connected, the capacitor to be charged may be separated from the power output unit 360. Thus, the receiver 310 and the power output unit 360 may be separated by a switch operation of the switch controller 330.

The power charged in the one or more capacitors and the modulated first data may be transferred to the target device by connecting the one or more charged capacitors to the target device. The switch controller 330 may connect the one or more charged capacitors to the power output unit 360 during the transfer time to connect the charged capacitor among the one or more capacitors to the target device.

The demodulator 340 may be configured to demodulate the modulated first data based on the power amount stored in the one or more capacitors at the point in time when the charging time is switched to the transfer time. The charging time may indicate a time used to charge the one or more capacitors using the receiver 310. Also, the charging time may include a time used to receive the modulated first data from the source resonator using the target resonator. The transfer time may indicate a time used to transfer the power charged in the one or more capacitors and the demodulated first data to the target device.

For a single capacitor, the demodulator 340 may demodulate the modulated first data based on the power amount stored in the single capacitor at the point in time when the charging time is switched to the transfer time. For multiple capacitors, the demodulator 340 may demodulate the modulated first data based on the power amount stored in the each of the capacitors.

The demodulator 340 may demodulate the modulated first data based on the power amount stored in the single capacitor at a point in time when the charging time is switched to the charging time with respect to another capacitor after the charging time with respect to the single capacitor terminates.

The first data may be modulated by quantizing the power amount into N levels. The demodulator 340 may demodulate the modulated first data based on predetermined mapping information. Information corresponding to each of the quantized N levels may be stored in the predetermined mapping information The modulator 350 may modulate the second data by adjusting the power amount to be charged in the one or more capacitors. The modulator 350 may modulate the second data based on the power amount stored in the one or more capacitors. Mapped information may be different based on the amount of power stored in the one or more capacitors.

The modulator 350 may include a quantizer configured to quantize the power amount to be stored in the one or more capacitors into a plurality of levels, and/or a mapping unit configured to map predetermined information for each level to the power amount quantized into the plurality of levels. The second data may indicate information that the wireless power and data reception apparatus desires to transfer to the wireless power and data transmission apparatus. The second data may include information used for a control of the wireless power and data transmission and reception system.

The modulator 350 may be configured to modulate the second data by quantizing the power amount charged in the one or more capacitors into M levels.

The power output unit 360 may transfer the power charged in the one or more capacitors and the demodulated first data to the target device. The one or more capacitors charged at the receiver 310 may be connected to the power output unit 360 using the switch controller 330. For example, the power output unit 360 may transfer the power charged in the one or more capacitors and the demodulated first data to the target device.

The sensing unit 370 may be configured to sense a voltage of the one or more capacitors at the point in time when the charging time is switched to the transfer time. For example, the demodulator 340 may demodulate the modulated first data based on the sensed voltage.

Figure 4A:
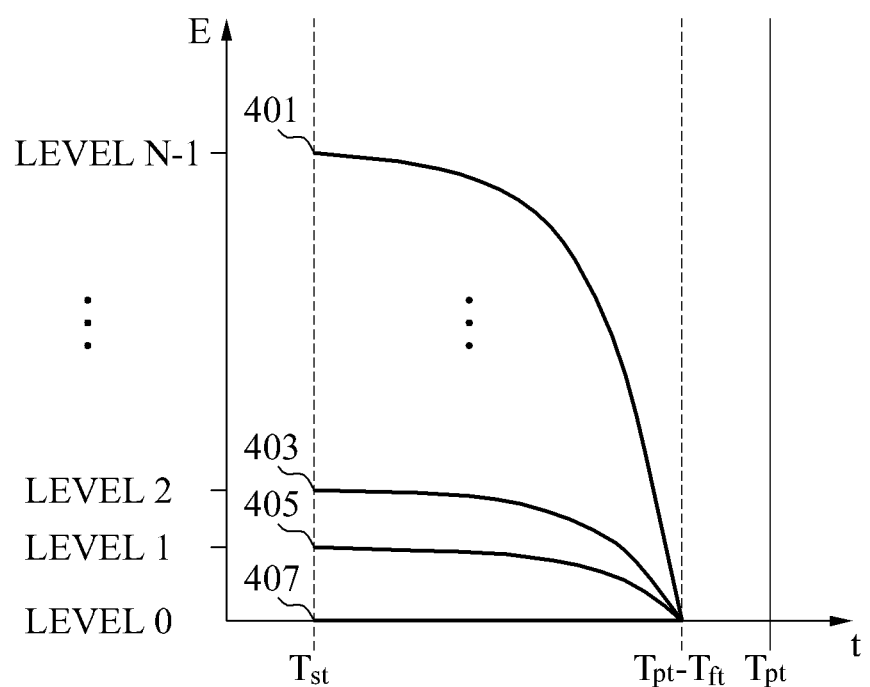
FIGS. 4A and 4B are diagrams illustrating modulation processes of a wireless power and data transmission apparatus.
Figure 4B:
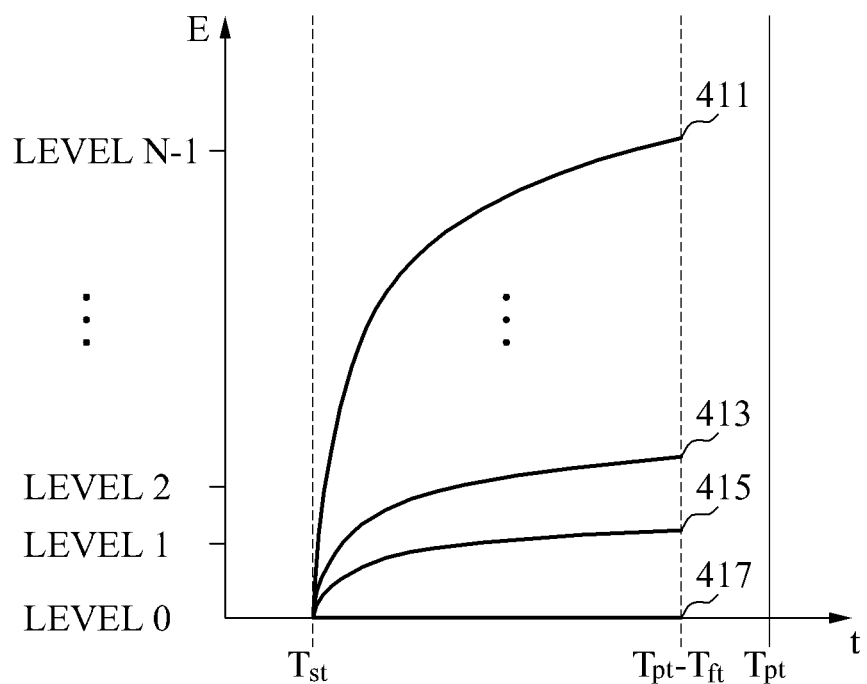

FIGS. 4A and 4B illustrate modulation processes of a wireless power and data transmission apparatus.

More particularly, FIGS. 4A and 4B illustrate induced energy modulations to transfer information using an energy transmission, from a point of view of a wireless power and data transmission apparatus. Energy may be indicated as an integral of a power during a predetermined time, and thus the energy transmission and the power transmission may have an identical meaning Generally, the induced energy modulation schemes of FIGS. 4A and 4B may represent transferring information from an energy transmission end to an energy reception end. However, the induced energy modulation scheme may not be limited to transferring the information from the energy transmission end to the energy reception end. In FIGS. 4A and 4B, the energy transmission end may include a wireless power and data transmission apparatus, and the energy reception end may include a wireless power and data reception apparatus.

In one or more embodiments, induced energy may be used to transfer information. Thus, the examples illustrated in FIGS. 4A and 4B may be applied to a general wireless information communication scheme.

A symbol duration $T_{pt}$ may correspond to a time used to transfer energy of a capacitor connected to the energy transmission end to a capacitor connected to the energy reception end. The symbol duration may indicate a transfer time of the wireless power and data transmission apparatus. The symbol duration $T_{pt}$ may include a first marginal time, a transmission time, and a second marginal time.

The first marginal time $T_{st}$ may indicate a time used to connect the switches to the charged capacitor of the energy transmission end.

The second marginal time $T_{ft}$ may indicate a time used to open the switches connected to the capacitor of the energy transmission end after the transmission time terminates.

The transmission time $T_{pt}$-$T_{st}$-$T_{ft}$ may indicate a time used when charged energy is actually transferred from the energy transmission end to the energy reception end. For example, the transmission time $T_{pt}$-$T_{st}$-$T_{ft}$ may indicate a time used to open switches connected to the capacitor after the capacitor of the energy reception end is charged.

FIG. 4A may correspond to storage energy of the capacitor connected to the transmission end. The energy transmission end may connect the charged capacitor after a lapse of the first marginal time. For example, the modulator 220 may modulate the first data by adjusting an amount of the energy to be stored in the capacitor.

Referring to FIGS. 4A and 4B, the modulator 220 may modulate the first data using energy quantized into N levels. According to various embodiments, information may be mapped in each of the N levels. For example, a capacitor 407 of level 0 where energy is not charged at all may indicate "0", a capacitor 405 where energy of level 1 is charged may indicate "1", a capacitor 403 where energy of level 2 is charged may indicate "2", and a capacitor 401 where energy of level N–1 is charged may indicate "N–1" in the same method. The energy transmission end may transfer log N-bit information to a single symbol by adjusting the energy level.

FIG. 4B may correspond to a result that the transmitted energy is stored in the capacitor of the reception end, for example, using a magnetic coupling in the energy transmission end. The energy reception end having received the transferred energy may demodulate the first data by sensing the level of the energy stored in the capacitor. The demodulator 230 may demodulate the first data based on the level of the energy stored in the capacitor.

For example, when the level of the energy stored in the capacitor corresponds to N–1 (411), mapped information may indicate N–1. In the same method, when the level of the energy stored in the capacitor corresponds to 2 (413), the mapped information may indicate 2, when the energy stored in the capacitor corresponds to 1 (415), the mapped information may indicate 1, and when the level of the energy stored in the capacitor corresponds to 0 (417), the mapped information may indicate 0.

Figure 5A:
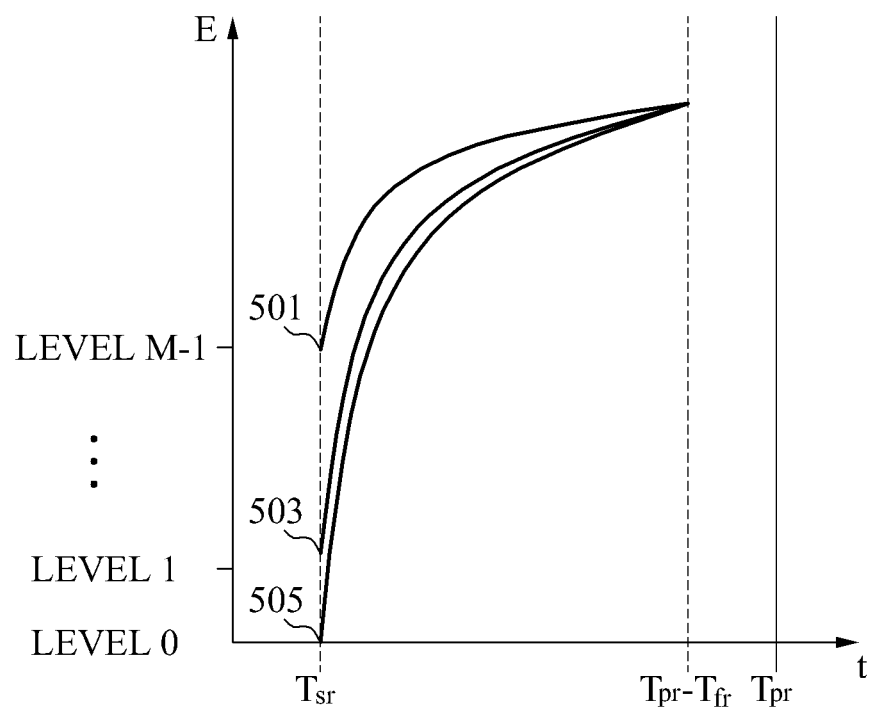
FIGS. 5A and 5B are diagrams illustrating modulation processes of a wireless power and data reception apparatus.
Figure 5B:
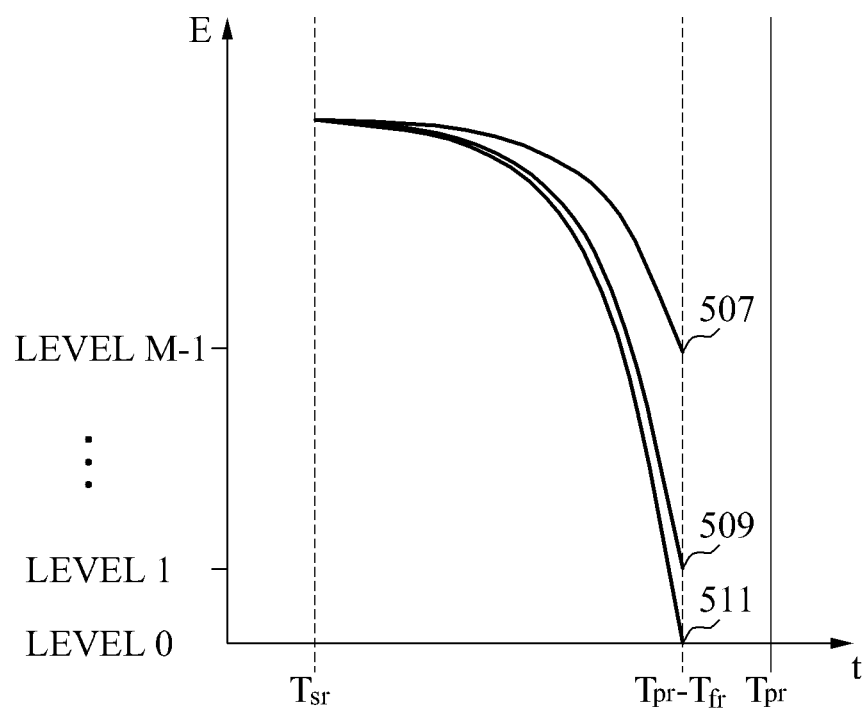

FIGS. 5A and 5B illustrate modulation processes of a wireless power and data reception apparatus.

FIG. 5A may correspond to storage energy of a capacitor connected to an energy reception end. FIG. 5B may correspond to a result that transmitted energy is stored in a capacitor of an energy transmission end, for example, using a magnetic coupling in the energy reception end. In FIGS. 5A and 5B, the energy transmission end may include a wireless power and data transmission apparatus, and the energy reception end may include a wireless power and data reception apparatus. Symbol duration $T_{pr}$ may correspond to a time used to transfer energy of the capacitor connected to the energy reception end to the capacitor connected to the energy transmission end. The symbol duration may indicate a charging time of the wireless power and data reception apparatus. The symbol duration $T_{pr}$ may include a first marginal time, a reception time, and a second marginal time.

The first marginal time $T_{sr}$ may indicate a time used to connect the switches to the capacitor charged equivalent to a quantized level of the energy reception end.

The second marginal time $T_{fr}$ may indicate a time used to open switches connected to the capacitor of the energy reception end after the reception time terminates.

The reception time $T_{pr}$-$T_{sr}$-$T_{fr}$ may indicate a time used to receive the charged energy from the energy transmission end. The energy reception end may transfer the energy charged as equivalent to the quantized level to the energy transmission end.

The symbol duration of the energy transmission end and the energy reception end may be equivalent. However, the first marginal time of the energy reception end may be shorter than the first marginal time of the energy transmission end in order to operate the energy reception end.

The modulator 350 of the energy reception end may modulate the second data by adjusting the energy to be stored in the capacitor. The modulator 350 may modulate the second data using energy quantized into M levels. Information may be mapped in each of the M levels.

Energy 501, energy 503, and energy 505 that are initially stored in the capacitor of the energy reception end may be transmitted to the energy transmission end during the reception time within the symbol duration. After the reception time terminates, when the switches connected to the capacitor of the energy reception end are open, the transmitted energy may be stored in the capacitor of the energy transmission end.

The energy transmission end may be configured to demodulate the modulated second data by sensing energy 507, energy 509, and energy 511. The demodulator 340 may be configured to demodulate the second data based on the level of the energy stored in the capacitor.

The transmission scheme through adjustment of an amount of energy applied to transmission and reception circuits may be referred to as an induced energy modulation. The induced energy modulation scheme may enable full duplex communication. The transmission and reception ends may simultaneously transfer information to each other. Energy to be injected in the transmission and reception ends may be transferred to an opposite circuit after the symbol duration. For instance, the energy to be injected may be unrelated to an amount of energy initially stored in the opposite circuit since linear duplication of energy transfer is used.

FIGS. 6A through 6D illustrate full duplex communication processes in a wireless power and data transmission and reception system.

In FIGS. 6A through 6D, an energy transmission end may include a wireless power and data transmission apparatus, and an energy reception end may include a wireless power and data reception apparatus.

Referring to FIGS. 6A through 6D, each of the energy transmission end and the energy reception end may have two energy levels of L1 and L0. Information may be mapped in each of the levels, and level 0 may indicate "0", and level 1 may indicate "1".

Since each of the energy transmission end and the energy reception end have two energy levels, four energy changes may occur in total.

In FIGS. 6A through 6D, solid lines may indicate an amount of energy stored in a capacitor of the energy transmission end, and dotted lines may indicate an amount of energy stored in a capacitor of the energy reception end. The capacitor of the energy transmission end will be hereinafter referred to as a "first capacitor," and the capacitor of the energy reception end will be herein after referred to as a "second capacitor."

Figure 6A:
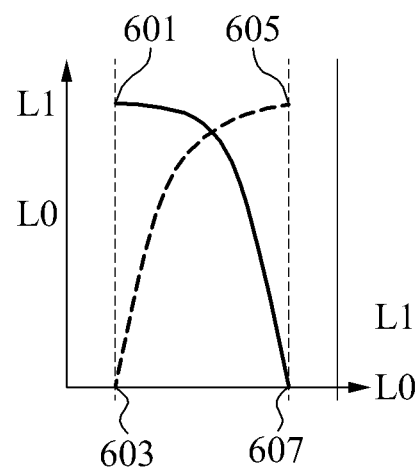
FIGS. 6A through 6D are diagrams illustrating full duplex communication processes in a wireless power and data transmission and reception system.

FIG. 6A may indicate an amount of energy to be stored in the first capacitor and the second capacitor when the energy transmission end transmits "1", and the energy reception end transmits "0". Energy 601 initially stored in the first capacitor may correspond to level 1, and energy 603 initially stored in the second capacitor may correspond to level 0. The energy 601 initially stored in the first capacitor may have a status of energy 607 after a lapse of the transmission time. The energy 603 initially stored in the second capacitor may have a status of energy 605 after a lapse of the reception time. For example, the transmission time and the reception time may be equivalent.

The energy transmission end may demodulate information based on the energy level 607 of the first capacitor after the lapse of the transmission time. Since the energy level 607 of the first capacitor correspond to level 0, information transmitted from the energy reception end may correspond to "0". The energy reception end may demodulate information based on the energy level 605 of the second capacitor after the lapse of the reception time. Since the energy level 605 of the second capacitor corresponds to level 1, information transmitted from the transmission end may correspond to "1".

Figure 6B:
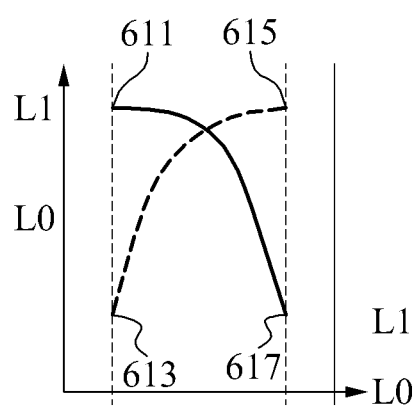

FIG. 6B may indicate an amount of energy to be stored in the first capacitor and the second capacitor when the energy transmission end transmits "1", and the energy reception end transmits "1". Energy 611 initially stored in the first capacitor may correspond to level 1, and energy 613 initially stored in the second capacitor may correspond to level 1. The energy 611 initially stored in the first capacitor may have a status of energy 617 after a lapse of the transmission time. The energy 613 initially stored in the second capacitor may have a status of energy 615 after a lapse of the reception time.

The energy transmission end may demodulate information based on the energy level 617 of the first capacitor after the lapse of the transmission time. Since the energy level 617 of the first capacitor correspond to level 1, information transmitted from the energy reception end may correspond to "1". The energy reception end may demodulate information based on the energy level 615 of the second capacitor after the lapse of the reception time. And, since the energy level 615 of the second capacitor corresponds to level 1, information transmitted from the transmission end may correspond to "1".

Figure 6C:
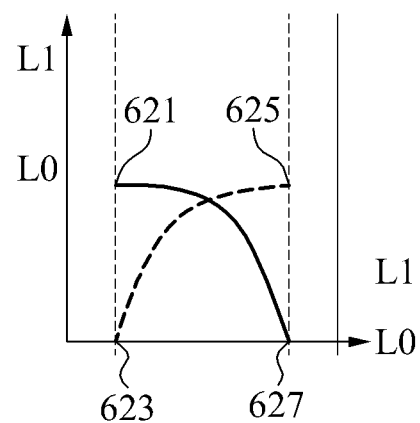

FIG. 6C may indicate an amount of energy to be stored in the first capacitor and the second capacitor when the energy transmission end transmits "0", and the energy reception end transmits "0". Energy 621 initially stored in the first capacitor may correspond to level 0, and energy 623 initially stored in the second capacitor may correspond to level 0. The energy 621 initially stored in the first capacitor may have a status of energy 627 after a lapse of the transmission time. The energy 623 initially stored in the second capacitor may have a status of energy 625 after a lapse of the reception time.

The energy transmission end may demodulate information based on the energy level 627 of the first capacitor after the lapse of the transmission time. Since the energy level 627 of the first capacitor corresponds to level 0, information transmitted from the energy reception end may correspond to "0". The energy reception end may demodulate information based on the energy level 625 of the second capacitor after the lapse of the reception time. And since the energy level 625 of the second capacitor corresponds to level 0, information transmitted from the transmission end may correspond to "0".

Figure 6D:
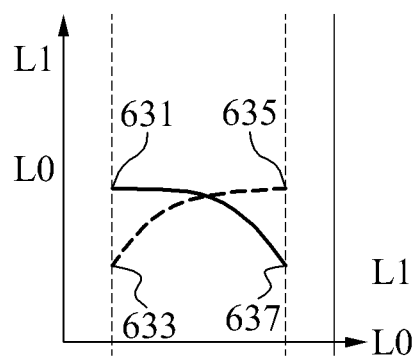

FIG. 6D may indicate an amount of energy to be stored in the first capacitor and the second capacitor when the energy transmission end transmits "0", and the energy reception end transmits "1". Energy 631 initially stored in the first capacitor may correspond to level 0, and energy 633 initially stored in the second capacitor may correspond to level 1. The energy 631 initially stored in the first capacitor may have a status of energy 637 after a lapse of the transmission time. The energy 633 initially stored in the second capacitor may have a status of energy 635 after a lapse of the reception time.

The energy transmission end may demodulate information based on the energy level 637 of the first capacitor after the lapse of the transmission time. Since the energy level 637 of the first capacitor correspond to level 1, information transmitted from the energy reception end may correspond to "1". The energy reception end may demodulate information based on the energy level 635 of the second capacitor after the lapse of the reception time. And since the energy level 635 of the second capacitor corresponds to level 0, information transmitted from the transmission end may correspond to "0".

As described above, full duplex communication may be feasible using a scheme of demodulating energy to be stored in a capacitor into a predetermined energy level. Quantization of the energy level to be stored in the capacitor may be independently performed in the energy transmission end and the energy reception end. For example, the energy transmission end may quantize the energy level into N levels, and the energy reception end may quantize the energy level into M levels.

Figure 7:
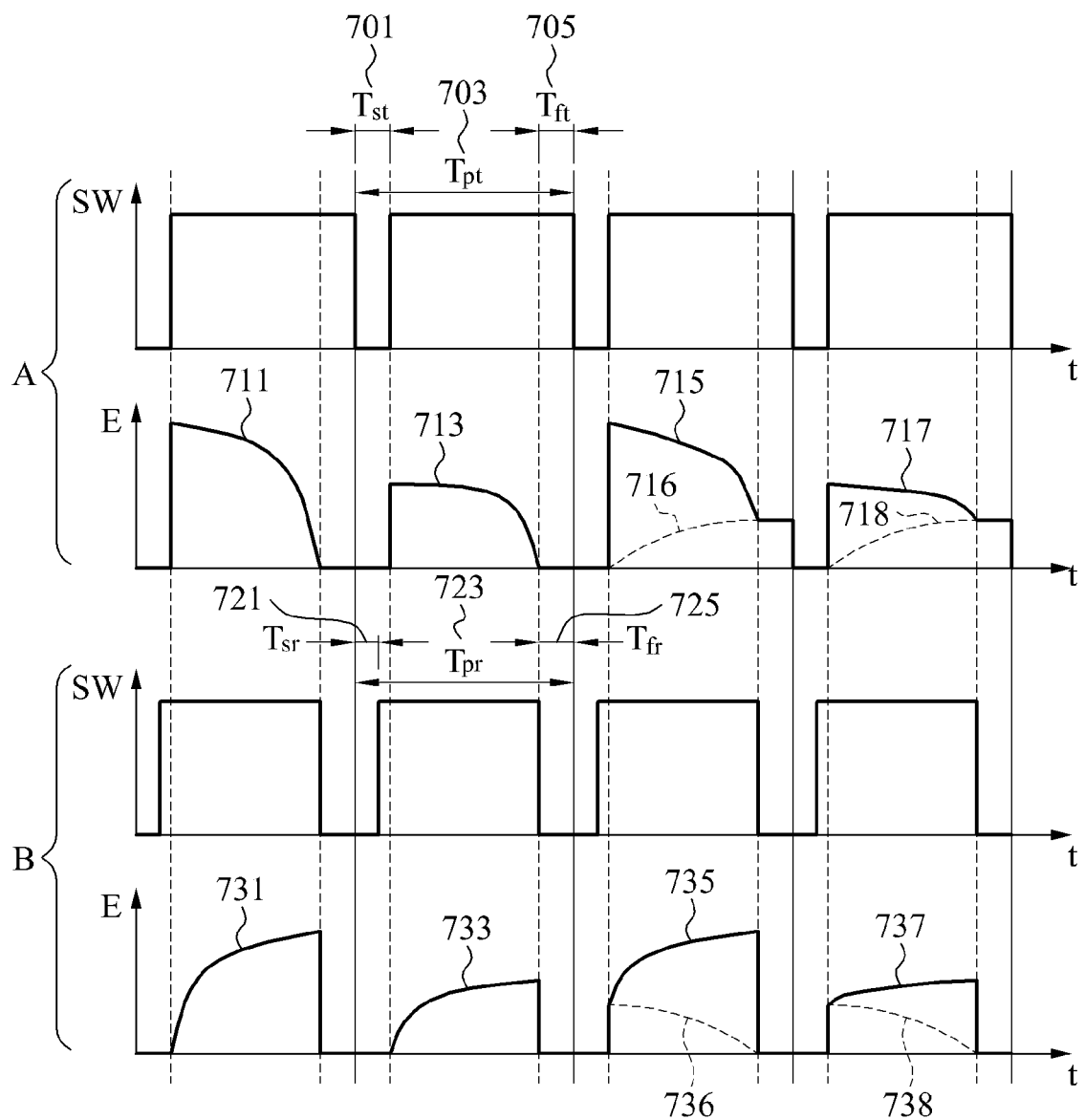
FIG. 7 is a diagram illustrating a process of transmitting and receiving data in a wireless power and data transmission and reception system.

FIG. 7 illustrates a process of transmitting and receiving data in a wireless power and data transmission and reception system.

A process of transmitting and receiving data in an energy transmission end and an energy reception end may be based on a time flow. In FIG. 7, the energy transmission end may include a wireless power and data transmission apparatus, and the energy reception end may include a wireless power and data reception apparatus. A capacitor of the energy transmission end will be hereinafter referred to as a first capacitor, and a capacitor of the energy reception end will be herein after referred to as a second capacitor.

The upper portion A of FIG. 7 may indicate a switching time when charged capacitors are connected to the transmitter 250, and energy stored in the connected capacitors, in the energy transmission end. The lower portion B of FIG. 7 may indicate a switching time when capacitors are connected to the receiver 310, and energy stored in the connected capacitors, in the energy reception end.

The first capacitor of the energy transmission end may be connected to the transmitter 250 after a lapse of a first marginal time $T_{st}$ 701. When symbol duration $T_{pt}$ 703 terminates, switches to connect the first capacitor and the transmitter 250 may be open. A second marginal time $T_{ft}$ 705 may correspond to a time used to open the switches connected with the transmitter 250 after the energy is transmitted from the energy transmission end to the energy reception end.

Energy 711, energy 713, energy 715, and energy 717, quantized into various levels, may be stored in the first capacitor. Information may be mapped in each of the quantized levels. The energy transmission end may transmit modulated first data to the energy reception end using the quantized energy during the transmission time. Thus, the energy stored in the first capacitor may be reduced. Also, the energy transmission end may receive modulated second data from the energy reception end using quantized energy 716 and energy 718 during the transmission time. The energy stored in the first capacitor may be sensed at a point in time when symbol duration 703 terminates.

A remaining energy amount 716, and a remaining energy amount 718 in the first capacitor of the energy transmission end after the symbol duration terminates may be different based on an energy amount 736 and an energy amount 738 that are initially injected into the second capacitor of the energy reception end. The demodulator 230 may demodulate the modulated second data based on an energy level. The energy transmission end may receive information from the energy reception end using a demodulation.

The second capacitor of the energy reception end may be connected to the receiver 310 after a lapse of a first marginal time $T_{sr}$ 721. To receive information at the energy reception end, the energy reception end should first operate. The first marginal time $T_{sr}$ 721 of the energy reception end may be shorter than the first marginal time $T_{st}$ 701 of the energy transmission end in order to first receive an operating power used when the energy reception end operates. However, in the case that a separate operating power is prepared, the first marginal time $T_{sr}$ 721 may be equivalent to the first marginal time $T_{st}$ 701 of the energy transmission end.

When the second capacitor is charged, switches to connect the second capacitor and the receiver 310 may be open. The energy reception end may receive energy during symbol duration $T_{pr}$ 723 equivalent to the symbol duration $T_{pt}$ 703 of the energy transmission end. Also, the energy reception end may transmit energy 736 and energy 738 initially stored in the second capacitor to the energy transmission end during the symbol duration $T_{pr}$ 723. As the switches to connect the second capacitor and the receiver 310 are open, switches to connect the first capacitor and the transmitter 250 may be open.

A second marginal time $T_{fr}$ 725 may correspond to a time used to open the switches connected with the receiver 310 after energy is received from the energy transmission end. The second marginal time $T_{fr}$ 725 may be shorter than the second marginal time $T_{ft}$ 705 of the energy transmission end.

Energy 731, energy 733, energy 735, energy 737, quantized into various levels by receiving energy from the energy transmission end, may be stored in the second capacitor. The demodulator 340 may demodulate the first data using information mapped in each of the levels. The energy reception end may receive the modulated first data using the quantized energy during the reception time. Thus, the energy stored in the second capacitor may be increased. Also, the energy reception end may transmit the modulated second data using energy 736 and energy 738 quantized by the energy transmission end during the reception time. The energy stored in the second capacitor may be sensed at a point in time when the symbol duration 723 terminates.

FIG. 8 illustrates a wireless power and data transmission method.

In operation 810, a wireless power and data transmission apparatus may modulate first data by adjusting a power amount to be charged in one or more capacitors. The wireless power and data transmission apparatus may modulate the first data by quantizing the power amount charged in the capacitors into N levels. The first data may indicate information that the wireless power and data transmission apparatus desires to transfer to a wireless power and data reception apparatus. The first data may include information used for a control of a wireless power and data transmission and reception system.

In operation 820, the wireless power and data transmission apparatus may control one or more switches corresponding to the one or more capacitors, respectively. Switching may be based on a charging time to charge the capacitors, and based on a transfer time to transfer the power charged in the capacitors and the modulated first data to a source resonator.

In operation 830, the wireless power and data transmission apparatus may transmit the charged power and the modulated first data transferred to the source resonator, for example, using a magnetic coupling, and may receive modulated second data. The modulated second data may be transmitted from a target resonator of the wireless power and data reception apparatus.

In operation 840, the wireless power and data transmission apparatus may demodulate the modulated second data based on the power amount stored in the one or more capacitors at a point in time when the transfer time is switched to the charging time. The wireless power and data transmission apparatus may demodulate the second data modulated by quantizing the power amount into M levels, based on predetermined mapping information. Information corresponding to each of the quantized M levels may be stored in the predetermined mapping information. The second data may indicate information that the wireless power and data reception apparatus desires to transfer to the wireless power and data transmission apparatus. The second data may include information used for a control of the wireless power and data transmission and reception system.

The wireless power and data transmission apparatus may charge the one or more capacitors by receiving an input of a power from a power supply apparatus, and may receive the modulated second data from the target resonator during the transfer time using the source resonator.

FIG. 9 illustrates a wireless power and data reception method.

In operation 910, a wireless power and data reception apparatus may modulate second data by adjusting a power amount to be charged in one or more capacitors, and may transmit the modulated second data. The wireless power and data reception apparatus may modulate the second data by quantizing the power amount into M levels. Also, the wireless power and data reception apparatus may transmit the modulated second data simultaneously with receiving a wireless power and the first data.

In operation 920, the wireless power and data reception apparatus may receive the wireless power and the modulated first data using a target resonator. The first data may be modulated at a wireless power and data transmission apparatus. The first data may indicate information that the wireless power and data transmission apparatus desires to transfer to the wireless power and data reception apparatus. The first data may include information used for a control of a wireless power and data transmission and reception system.

In operation 930, the wireless power and data reception apparatus may charge the one or more capacitors. The wireless power and data reception apparatus may charge the one or more capacitors using the received wireless power and the modulated first data.

In operation 940, the wireless power and data apparatus may control switches corresponding to the one or more capacitor, respectively. Switching may be based on a charging time to charge the one or more capacitors, and based on a transfer time to transfer the power charged in the one or more capacitors and the demodulated first data to a target device.

In operation 950, the wireless power and data reception apparatus may demodulate the modulated first data based on the power amount stored in the one or more capacitors at a point in time when the charging time is switched to the transfer time. The first data may be modulated by quantizing the power amount into N levels. The wireless power and data reception apparatus may demodulate the modulated first data based on predetermined mapping information. Information corresponding to each of the quantized N levels may be stored in the predetermined mapping information.

The wireless power and data reception apparatus may transmit the modulated second data to a source resonator during the charging time using the target resonator, and may transfer the power charged in the one or more capacitors and the demodulated first data to the target device.

One or more of the embodiments described herein may be recorded, stored, or fixed in one or more non-transitory computer-readable storage media that includes program code or instructions to be implemented by a computer to cause at least one processor to execute or perform the program instructions. The media may also include, alone or in combination with the program instructions, data files, data structures, and/or the like. The media and program instructions may be those specially designed and constructed, or they may be of the kind well-known and available to those having skill in the computer software arts.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A wireless power and data transmission apparatus comprising:
a modulator configured to modulate first data by adjusting a power amount to be charged in one or more capacitors;
a switch controller configured to control one or more switches corresponding to the one or more capacitors based on a charging time to charge the one or more capacitors and a transfer time to transfer a power charged in the one or more capacitors and the modulated first data to a source resonator,
wherein the transfer time comprises:
a first marginal time used when the one or more switches are connected to the charged one or more capacitors:
a transmission time used to transmit the wireless power charged in the one or more capacitors, and the modulated first data; and
a transmitter configured to transmit the charged power and the modulated first data using the source resonator.

2. The apparatus of claim 1, further comprising:
a power input unit configured to charge the one or more capacitors by receiving an input of a power from a power supply apparatus.

3. The apparatus of claim 2, wherein the power input unit is configured to charge the one or more capacitors by receiving an input of a power from a DC power supply apparatus or an AC power supply apparatus.

4. The apparatus of claim 1, further comprising:
a receiver configured to receive modulated second data from a target resonator during the transfer time, using the source resonator.

5. The apparatus of claim 4, further comprising:
a demodulator configured to demodulate the modulated second data based on the power amount stored in the one or more capacitors at a point in time when the transfer time is switched to the charging time.

6. The apparatus of claim 1, wherein the modulator is configured to modulate the first data by quantizing the power amount into N levels.

7. The apparatus of claim 1, wherein the switch controller is configured to control the one or more switches so that overlap between the charging time and the transfer time is avoided for a single capacitor.

8. The apparatus of claim 1, wherein the switch controller is configured to transfer the charged power and the modulated first data to the source resonator by controlling the one or more switches corresponding to each of the charged one or more capacitors at predetermined time intervals based on the transfer time.

9. The apparatus of claim 1, wherein the transfer time comprises
a second marginal time used to open the one or more switches connected to the one or more capacitors after the transmission time terminates.

10. The apparatus of claim 5, wherein the demodulator is configured to demodulate the modulated second data by quantizing the power amount into M levels, based on predetermined mapping information.

11. The apparatus of claim 10, further comprising a sensing unit configured to sense a voltage of the one or more capacitors at the point in time when the transfer time is switched to the charging time,
wherein the demodulator is configured to demodulate the modulated second data based on the sensed voltage.

12. The apparatus of claim 1, wherein the one or more capacitors are arranged in a parallel manner.

13. The apparatus of claim 1, wherein the switch controller is configured to sense the power stored in the one or more capacitors connected to the transmitter.

14. The apparatus of claim 1, wherein the switch controller is configured to control the charging time so that the one or more capacitors are connected to a power input unit in response to a power being discharged lower than a predetermined value.

15. The apparatus of claim 1, further comprising a sensing unit configured to sense a voltage of the one or more capacitors at a point in time when the transfer time is switched to the charging time.

16. A wireless power and data reception apparatus comprising:
a receiver configured to charge one or more capacitors by receiving wireless power and modulated first data using a target resonator;
a switch controller configured to control one or more switches corresponding to the one or more capacitors based on a charging time to charge the one or more capacitors and a transfer time to transfer a power charged in the one or more capacitors and demodulated first data to a target device,
wherein the charging time comprises:
a first marginal time used when the one or more switches are connected to the one or more capacitors:
a reception time used to receive the wireless power charged in the one or more capacitors, and the modulated first data; and
a demodulator configured to demodulate the modulated first data based on a power amount stored in the one or more capacitors at a point in time when the charging time is switched to the transfer time.

17. The apparatus of claim 16, further comprising:
a modulator configured to modulate second data by adjusting the power amount to be charged in the one or more capacitors.

18. The apparatus of claim 17, further comprising:
a transmitter configured to transmit the modulated second data to a source resonator during the charging time using the target resonator.

19. The apparatus of claim 16, further comprising:
a power output unit configured to transfer the power charged in the one or more capacitors and the demodulated first data to the target device.

20. The apparatus of claim 18, wherein the modulator is configured to modulate the second data by quantizing the power amount into M levels.

21. The apparatus of claim 16, wherein the switch controller is configured to control the one or more switches so that overlap between the charging time and the transfer time is avoided for a single capacitor.

22. The apparatus of claim 16, wherein the switch controller is configured to control the charging time and the transfer time by sensing the power stored in the one or more capacitors.

23. The apparatus of claim 18, wherein the switch controller is configured to transfer the modulated second data to the target resonator by controlling the one or more switches corresponding to each of the one or more capacitors at predetermined time intervals based on the charging time.

24. The apparatus of claim 16, wherein the charging time comprises
a second marginal time used to open the one or more switches connected to the one or more capacitors after the reception time terminates.

25. The apparatus of claim 16, wherein the demodulator is configured to demodulate the first data modulated by quantizing the power amount into N levels, based on predetermined mapping information.

26. The apparatus of claim 16, further comprising a sensing unit configured to sense a voltage of the one or more capacitors at the point in time when the charging time is switched to the transfer time,
wherein the demodulator is configured to demodulate the modulated first data based on the sensed voltage.

27. The apparatus of claim 16, wherein the one or more capacitors are arranged in a parallel manner.

28. A wireless power and data transmission method comprising:
modulating first data by adjusting a power amount to be charged in one or more capacitors;
controlling one or more switches corresponding to each of the one or more capacitors based on a charging time to charge the one or more capacitors, and a transfer time to transfer the power charged in the one or more capacitors and the modulated first data to a source resonator,
wherein the charging time comprises:
a first marginal time used when the one or more switches are connected to the one or more capacitors;
a reception time used to receive the wireless power charged in the one or more capacitors, and the modulated first data; and
transmitting the charged power and the modulated first data using the source resonator.

29. The method of claim 28, further comprising:
charging the one or more capacitors by receiving an input of a power from a power supply apparatus.

30. The method of claim 28, further comprising:
receiving the modulated second data from a target resonator during the transfer time, using the source resonator.

31. The method of claim 30, further comprising:
demodulating second data modulated based on the power amount stored in the one or more capacitors at a point in time when the transfer time is switched to the charging time.

32. The method of claim 28, wherein the modulating modulates the first data by quantizing the power amount into N levels.

33. The method of claim 31, wherein the demodulating demodulates the second data modulated by quantizing the power amount into M levels, based on predetermined mapping information.

34. A wireless power and data reception method comprising:
charging one or more capacitors by receiving wireless power and modulated first data using a target resonator;
controlling one or more switches corresponding to each of the one or more capacitors based on a charging time to charge the one or more capacitors, and based on a transfer time to transfer a power charged in the one or more capacitors and demodulated first data to a target device,
wherein the charging time comprises:
a first marginal time used when the one or more switches are connected to the one or more capacitors:
a reception time used to receive the wireless power charged in the one or more capacitors, and the modulated first data; and
demodulating the modulated first data based on a power amount stored in the one or more capacitors at a point in time when the charging time is switched to the transfer time.

35. The method of claim 34, further comprising:
modulating second data by adjusting the power amount to be charged in the one or more capacitors.

36. The method of claim 35, further comprising:
transmitting the modulated second data to a source resonator during the charging time using the target resonator.

37. The method of claim 34, further comprising:
transferring the power charged in the one or more capacitors and the demodulated first data to the target device.

38. The method of claim 35, wherein the modulating modulates the second data by quantizing the power amount into M levels.

39. The method of claim 34, the demodulating demodulates the first data modulated by quantizing the power amount into N levels, based on predetermined mapping information.

* * * * *